US012708898B2

(12) United States Patent
Becker et al.

(10) Patent No.: US 12,708,898 B2
(45) Date of Patent: Aug. 18, 2026

(54) FERROELECTRIC BIOCHIP

(71) Applicant: Hahn-Schickard Gesellschaft für angewandte Forschung e.V., Stuttgart (DE)

(72) Inventors: Maximilian Becker, Tuebingen (DE); Claus Burkhardt, Tuebingen (DE)

(73) Assignee: Hahn-Schickard Gesellschaft für angewandte Forschung e. V., Stuttgart (DE)

( * ) Notice: Subject to any disclaimer, the term of this patent is extended or adjusted under 35 U.S.C. 154(b) by 546 days.

(21) Appl. No.: 18/205,755

(22) Filed: Jun. 5, 2023

(65) Prior Publication Data

US 2023/0302449 A1 Sep. 28, 2023

Related U.S. Application Data

(63) Continuation-in-part of application No. 18/133,100, filed on Apr. 11, 2023, and a continuation of (Continued)

(30) Foreign Application Priority Data

Oct. 12, 2020 (DE) ..................... 10 2020 126 759.2
Dec. 9, 2020 (DE) ..................... 10 2020 132 756.0

(51) Int. Cl.
*B01L 3/00* (2006.01)

(52) U.S. Cl.
CPC ... *B01L 3/502715* (2013.01); *B01L 3/502707* (2013.01); *B01L 2300/023* (2013.01)

(58) Field of Classification Search
CPC ......... B01L 3/502715; B01L 3/502707; B01L 2300/023; G01N 33/4836; G01N 33/4833
See application file for complete search history.

(56) References Cited

U.S. PATENT DOCUMENTS

2002/0076561 A1 6/2002 Vinet et al.
2005/0193823 A1 9/2005 Amano
(Continued)

FOREIGN PATENT DOCUMENTS

DE 102020126759 B3 2/2002
DE 10251243 B3 6/2004
(Continued)

OTHER PUBLICATIONS

International Preliminary Report on Patentability for International Application No. PCT/EP2021/077671, mailed Apr. 27, 2023.
(Continued)

*Primary Examiner* — Brian J. Sines
(74) *Attorney, Agent, or Firm* — Jason H. Vick; Amped IP LLC

(57) ABSTRACT

The present disclosure relates to a biochip comprising at least one coupling arrangement for electrical stimulation of biological material or for electrical measurements on the biological material, the biochip comprising: a support structure arranged at and/or in the coupling arrangement; and a layer, a layer surface of which is arranged at the coupling arrangement, and an opposite layer surface of which forms a coupling surface for stimulation of the biological material and/or for measurement on the biological material. To achieve improved stimulation efficiency of the biochip, it is proposed that the layer has ferroelectric properties.

19 Claims, 6 Drawing Sheets

Related U.S. Application Data application No. PCT/EP2021/084639, filed on Dec. 7, 2021, said application No. 18/133,100 is a continuation of application No. PCT/EP2021/077671, filed on Oct. 7, 2021.

(56) References Cited

U.S. PATENT DOCUMENTS

| | | | | |
|---|---|---|---|---|
| 2006/0240575 | A1 | 10/2006 | Wu et al. | |
| 2009/0226768 | A1 | 9/2009 | Wang et al. | |
| 2015/0226618 | A1* | 8/2015 | Shih | G01L 1/16 310/329 |
| 2017/0121661 | A1 | 5/2017 | Casset et al. | |
| 2020/0194592 | A1 | 6/2020 | Ionescu et al. | |

FOREIGN PATENT DOCUMENTS

| | | | |
|---|---|---|---|
| DE | 10351201 | B3 | 7/2005 |
| EP | 1085319 | A1 | 3/2001 |
| EP | 1478737 | B1 | 8/2005 |
| JP | H08-10339 | A | 1/1996 |
| KR | 102064462 | B1 | 1/2020 |
| WO | WO 2020/064440 | A1 | 4/2020 |

OTHER PUBLICATIONS

International Preliminary Report on Patentability for International Application No. PCT/EP2021/084639, mailed Jun. 22, 2023.

U.S. Appl. No. 18/133,100, filed Apr. 11, 2023, Becker et al.

Becker, Maximilian T. "Charge Injection Capacity of Ferroelectric Microelectrodes for Bioelectronic Applications" AIP Advances 11, 065106; 2021.

Chen, Changyong et al. "A Ferroelectric Ceramic/Polymer Composite-Based Capacitive Electrode Array for In Vivo Recordings" Advanced Healthcare Materials; 2017.

Chen, Xin et al. "Bioinspired Ferroelectric Polymer Arrays as Photodetectors with Signal Transmissible to Neuron Cells" Advanced Materials; 2016, 28, 106684-10691.

Hu, X.P. et al. "EXAFS Study of PZT Ferroelectric Thin Films of Different Crystallinities" 15th International Conference on X-ray Absorption Fine Structure (XAFS15); Journal of Physics: Conference Series 430 (2013) 012093.

Mcclure, D.J., et al. "Characterization of Amorphous Barium Titanate Films Prepared by rf Sputtering" J. Vac. Sci. Technol., 16(2), Mar./Apr. 1979.

Nguyen, Thanh D. et al. "Piezoelectric Nanoribbons for Moniforing Cellular Deformations" Nature Nanotechnology: vol. 7; Sep. 2012.

Zhang, Ping-Cheng et al. "Voltage-Induced Membrane Movement" Nature, vol. 413; Sep. 2001.

International Search Report for International Application No. POT/EP2021/077671, mailed Jan. 31, 2022.

Written Opinion for International Application No. PCT/EP2021/077671, mailed Jan. 31, 2022.

International Search Report for International Application No. PCT/EP2021/084639, mailed Apr. 7, 2022.

Written Opinion for International Application No. PCT/EP2021/084639, mailed Apr. 7, 2022.

* cited by examiner

FERROELECTRIC BIOCHIP

CROSS-REFERENCE TO RELATED APPLICATIONS

This application is a Continuation of International Patent Application PCT/EP2021/084639, filed Dec. 7, 2021 and designating the United States, which was published in German as WO 2022/122756 A1, and claims priority to German patent application DE 10 2020 132 756.0, filed Dec. 9, 2020. This application is also at Continuation-in-Part of U.S. patent application Ser. No. 18/133,100 filed Apr. 11, 2023, which is a Continuation application of International Patent Application PCT/EP2021/077671, filed Oct. 7, 2021 and designating the United States, which was published in German as WO 2022/078864 A1, and claims priority to German patent application DE 10 2020 126 759.2, filed Oct. 12, 2020, each of which are incorporated herein by reference in their entirety.

FIELD

The invention relates to a biochip comprising at least one coupling arrangement for electrical stimulation of biological material or for electrical measurements on the biological material.

BACKGROUND

EP 1 478 737 B1 discloses a biochip adapted for capacitive stimulation and/or detection of biological tissues. To improve the coupling efficiency of the purely capacitive coupling provided in this biochip, it is suggested to use a dielectric with the highest possible relative dielectric constant $\varepsilon_r$, namely $TiO_2$.

Furthermore, semiconductor devices exist which have areas made of a ferroe-lectric material. Corresponding manufacturing processes are also known. An example of such a semiconductor device is the ferroelectric field effect transistor (FeFET). Such semi-conductor devices are used, for example, to manufacture non-volatile semiconductor memories.

Despite the progress achieved in the field of biochips with pure capacitive coupling, their stimulation efficiency is usually not sufficient to realize, for example, microelectrode arrays (MEAs) or electrically active implants with a high spatial density of electrodes. The stimulation efficiency determines the minimum area of individual electrodes for which effective electrical stimulation of the biological material, which may comprise neurons, is practical.

SUMMARY

It would among other objects be desirable to provide a biochip with improved stimulation efficiency, with which, for example, microelectrode arrays or electrically active implants with a high density of electrodes can be realized, whereby electrochemical degradation processes at the electrodes should also be prevented.

According to an embodiment of the present disclosure, a biochip comprising at least one coupling arrangement for electrical stimulation of biological material or for electrical measurements on the biological material, is provided, the biochip comprising: a support structure arranged at and/or in the at least one coupling arrangement; and a layer, a layer surface of which is arranged at the coupling arrangement and an opposite layer surface of which forms a coupling surface for electrical stimulation of the biological material and/or for electrical measurements on the biological material; wherein the layer has ferroelectric properties. In other words, the layer of such a biochip exhibits a nonlinear and/or hysteretic relationship between an electric field E within the layer and an electric displacement density D which is caused by the presence of a ferroelectric polarization $P^{(FE)}$ within the layer. This nonlinear and hysteretic behavior of this relationship D(E) is also referred to as ferroelectric behavior. In this sense, materials with ferroelectric properties also include antiferroelectric materials, ferrielectric materials, multiferroic materials or relaxor ferroelectric materials. Thus, the layer may comprise ferroelectric, antiferroelectric, ferrielectric, and/or relaxor-ferroelectric materials, or may consist of any of these materials.

The inventors have recognized that the layer with ferroelectric properties causes an additional contribution to the electrical stimulation of the biological material, which comes from the ferroelectric polarization in the layer. This additional contribution occurs in addition to a contribution due to the known purely capacitive stimulation. In many cases, the additional contribution can even be higher than the contribution of the purely capacitive coupling.

For example, the layer may comprise or be formed from hafnium oxide ($HfO_2$) with ferroelectric properties. Such ferroelectric hafnium oxide is compatible with known semiconductor processes, such as CMOS technology, allowing easy fabrication of the biochip.

Further improvement of the properties of the biochip and/or simplification of the fabrication process can be achieved by doping hafnium oxide, for example, if the hafnium oxide with ferroelectric properties is doped with silicon. Alternatively, the hafnium oxide may be doped with any of the following materials: Aluminum (Al), Germanium (Ge), Yttrium (Y), Gadolinium (Gd), Lanthanum (La) or Strontium (Sr).

For example, the hafnium oxide with ferroelectric properties may also be doped with zirconium (Zr). That is, the layer comprises or consists of a material of the class $Hf_{1-x}Zr_xO_2$.

Preferably, the material is $Hf_{0.5}Zr_{0.5}O_2$. This material has a high remanent polarization $P_r$ compared to other dopants with zirconium, making the additional contribution to electrical stimulation of biological material described above particularly pronounced.

It may also be provided that the layer comprises or consists of zirconium oxide ($ZrO_2$) having ferroelectric properties.

Furthermore, it is also possible that the layer comprises aluminum scandium nitride with ferroelectric properties or consists of aluminum scandium nitride. Aluminum scandium nitride refers to materials of the class $Al_{1-x}Sc_xN$. On the one hand, this class of material is compatible with common manufacturing processes, which are also used to produce CMOS circuits, and on the other hand, it exhibits a particularly high remanent polarization of over 100 $\mu C/cm^2$.

It is also possible that the layer comprises or consists of a ferroelectric perovskite and/or ferroelectric polymer.

The applicability of the technical teaching described here is not limited to materials with purely ferroelectric properties. It is also possible that the layer has multiferroic properties. Thus, the layer may comprise or may consist of a multiferroic material. The multiferroic material may, for example, be bismuth ferrite ($BiFeO_3$).

It shall be understood that any material systems mentioned in the prior art, such as barium titanate ($BaTiO_3$) or PZT (lead zirconate titanate, $Pb(Zr_xTi_{1-x})O_3$), do not by default have ferroelectric properties. In some publications, this is presented in an abbreviated and inaccurately simplified way. While material systems such as barium titanate and PZT can be configured such that they exhibit ferroelectric properties. However, this is by no means always the case (see for example D. J. McClure and J. R. Crowe; "Characterization of amorphous barium titanate films prepared by rf sputtering," Journal of Vacuum Science and Technology 16, 311 1979 for barium titanate without ferroelectric properties; and Hu et al, "EXAFS study of PZT ferroelectric thin films of different crystallinities," Journal of Physics: Conference Series 430 (2013), 15th International Conference on X-ray Absorption Fine Structure (XAFS15), 2013 for PZT without ferroelectric properties). In particular, for layers such as thin dielectric films with amorphous (possibly metallic) materials, it is not necessarily the case that these layers are configured such that they necessarily exhibit ferroelectric properties. If a material that may have ferroelectric properties as a "bulk" material (e.g., PZT or barium titanate) is fabricated as a layer or thin film, it is not necessarily the case that the fabricated layer or thin film will also have ferroelectric properties. However, it is possible to also provide a layer or thin film such that the layer or thin film has ferroelectric properties. The ferroelectric properties can be detected by measurement. Optionally, the layer with ferroelectric properties does not consist of barium titanate and/or the layer with ferroelectric properties does not consist of PZT. Optionally, the layer with ferroelectric properties does not comprise barium titanate and/or the layer with ferroelectric properties does not comprise PZT.

In particular in the case of electrical stimulation of the biological material, a thickness of the layer can be greater than 200 nm and in this case can preferably lie in the range between 200 nm and 1500 nm, in particular between 500 nm and 1500 nm or between 200 nm and 800 nm. Unlike known biochips, which exhibit exclusively capacitive coupling and thus rely on the lowest possible layer thickness to achieve the greatest possible coupling capacity, in the biochip described herein the layer thickness can be selected to be relatively high and still achieve good stimulation efficiency. The high layer thickness ensures good electrical insulation between the biochip and the biological material, i.e., low leakage currents. Furthermore, a biochip with a comparatively large layer thickness provides better long-term stability.

If the support structure comprises or consists of a substrate of a semiconductor material, the biochip can be easily fabricated using fabrication processes known from semiconductor technology. It may also be provided that the support structure comprises or consists of at least one of the following materials: polyimide, epoxy resin, parylene. These materials are biocompatible and therefore particularly suitable for manufacturing the biochip. However, other biocompatible and/or dielectric materials may also be used.

In particular, if the biochip is (also) adapted for electrical measurements on the biological material, the layer may form part of a ferroelectric field effect transistor (FeFET) of the biochip. Herein, the FeFET may form part of an input stage of a respective measurement circuitry. It is also possible that the FeFET belongs to an artificial neuron. This may, for example, be coupled to a biological neuron which is present in the biological material.

Hereby, it is possible that the coupling surface comprises or forms a gate electrode of the ferroelectric field effect transistor. Hereby, the layer can correspond to a ferroelectrically acting insulating layer of the FeFET. Alternatively, a multilayer structure of the gate region of the FeFET is also conceivable, wherein the gate region comprises the ferroelectric layer and a further layer, which may be an insulating layer.

The biochip can be adapted such that it has memresistive or memristive properties. In particular, the layer can be adapted such that a ferroelectric tunnel contact is formed. The biochip may be configured as a memristor. In particular, if the layer with ferroelectric properties is particularly thin, the memristive properties can occur in particular by forming a so-called ferroelectric tunnel contact. Memristive properties can then occur due to the ferroelectric properties of the layer between the electrodes: For example, because a ferroelectric tunnel contact is formed. Thus, the biochip may be adapted for a ferroelectric tunnel contact to form. A thickness of the layer with ferroelectric properties is, for example, less than or equal to 10 nm, in particular less than or equal to 7.5 nm, in particular less than or equal to 5 nm. A biochip adapted as a memristor can be used as an artificial synapse.

The biochip may be adapted to be used as part of an arrangement that couples at least one artificial neural network to a biological neural network. The biochip may be adapted to couple an artificial neuron to a biological neuron.

The biochip can comprise a plurality of coupling surfaces of different coupling arrangements of the biochip, which are separated from each other. Hereby, a coupling surface can be respectively assigned to each coupling arrangement. In this way, a multi-channel biochip can be provided. The coupling surfaces (coupling areas) can for example be arranged along a line or in a grid. Such a biochip can have several layers with ferroelectric properties separated from each other.

According to a further embodiment, a method of fabricating a biochip comprising at least one coupling arrangement for electrical stimulation of biological material or for electrical measurements on the biological material is provided, the method comprising: arranging a support structure at and/or in the coupling arrangement; and fabricating a layer such that its one layer surface is arranged at the coupling arrangement and its opposite layer surface forms a coupling surface for electrical stimulation of the biological material and/or for electrical measurements on the biological material, wherein the layer is fabricated as a layer with ferroelectric properties. With such a method, the advantages described above in connection with the biochip can be realized. The features of the biochip can be provided accordingly in the method.

Another embodiment comprises an electrically active implant comprising the biochip described herein.

The implant may, for example, be a retinal implant, a cochlear implant, an implant for deep brain stimulation, and/or an implant for providing a brain-machine interface. In general, implants may be provided for stimulating neurons and/or providing measurements on neurons, wherein such implants comprise at least one biochip described herein.

In yet another embodiment, an in vitro assembly comprising a biochip described herein and an electrolyte receptacle, that is, an arrangement for receiving an electrolyte, is disclosed, wherein the electrolyte receptacle is adapted to dispose the electrolyte on at least one coupling surface of the biochip for electrical stimulation of the biological material and/or electrical measurement of the biological material.

Hereby, an in vitro assembly comprising at least one biological neuron and at least one artificial neuron may be provided. For example, the biological neuron may be formed by a neuron of the biological material present in the electrolyte. The artificial neuron may comprise an FeFET, which may be part of the biochip and may be embodied as described above.

The implant or in vitro device may comprise a semiconductor chip separate from the biochip, wherein a terminal of the semiconductor chip is electrically connected via a conductor track to an electrode layer adjacent to the layer surface and the conductor track and the biochip are arranged on a common substrate.

BRIEF DESCRIPTION OF THE DRAWINGS

Further features and advantages may be apparent from the following description. Herein.

DESCRIPTION OF PREFERRED EMBODIMENTS

Figure 1:
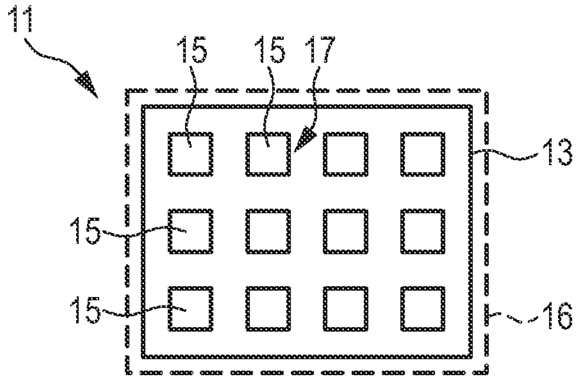
FIG. 1 shows a schematic diagram of an arrangement with a biochip.

FIG. 1 shows an arrangement 11 with a biochip 13. In the shown example, the arrangement comprises only one biochip 13. However, it is also possible to provide several biochips, preferably arranged in a grid next to each other, on or in the arrangement 11. The arrangement 11 comprises a plurality of coupling surfaces (coupling areas) 15. Depending on the exact embodiment, at least one of these coupling surfaces 15 may be arranged for electrical stimulation of biological material, in particular a nerve cell arranged therein. Furthermore, at least one of these coupling surfaces 15 may be arranged for electrical measurements on the biological material, in particular a nerve cell arranged therein. Thus, the biochip 13 may comprise a plurality of coupling surfaces 15, each coupling surface 15 being associated with exactly one coupling arrangement 21 of the biochip 13. The coupling surfaces 15 and/or the coupling arrangements 21 may be arranged along a line or, as shown in FIG. 1, in a grid.

The arrangement 11 may for example be an electrically active implant such as a neuroprosthesis. The arrangement may be a cochlear or retinal implant. Further, the arrangement 11 may be an implant for deep brain stimulation for treating neurological conditions such as Parkinson's disease. In such neuroprostheses 11, it may be provided that all coupling surfaces 15 of the at least one biochip 13 are adapted for stimulation of neurons (nerve cells).

Alternatively, the arrangement may be an in vitro arrangement comprising a microelectrode array (MEA) comprising microelectrodes corresponding to coupling surfaces 15. Such an in vitro arrangement may comprise at least one biological neuron formed by a neuron located in the biological tissue and/or at least one artificial neuron belonging to the biochip 13. Such an arrangement may be applied, for example, to the study of neural networks or neural tissue. The biological material can be arranged in an electrolyte that can be brought into contact with the biochip 13, in particular its coupling surfaces 15, via a suitable electrolyte receptacle of the arrangement 11, such as an electrolyte container 16.

Known devices 11 (for example neuroprostheses and not purely capacitive MEAs) feature electrically conductive (metallic) electrodes. Such electrodes allow a high charge transfer per unit area (stimulation efficiency) of electrical charge between the biological material and the biochip 11. The high stimulation efficiency allows the area of the individual electrodes to be kept small, which in turn allows a high area density of electrodes. However, it should be noted that a threshold of charge density to be transferred to the nerve tissue required for successful stimulation of nerve cells depends on the size of the electrodes or coupling surfaces 15.

A disadvantage of conductive electrodes is that irreversible electrochemical processes in the form of a Faraday current can occur at the electrode/electrolyte interface, which can lead to degradation of the electrode or lead to cell damage in the biological material. Faraday currents at the electrodes can be avoided, at least to a large extent, if a biochip with pure capacitive coupling is used. Such a biochip usually has conductive regions (for example, p-doped regions in silicon) covered with a dielectric layer that prevents Faraday currents. However, the stimulation efficiency of these biochips is relatively low and is determined in particular by the relative dielectric constant of the dielectric layer and its thickness. Thus, efforts are made to use materials with the highest possible relative dielectric constant and to keep the thickness of the layer low. However, a low layer thickness can lead to increased leakage currents, which counteracts the goal of reducing irreversible processes.

In the arrangement 11 described herein, the biochip 13 comprises at least one layer 17 with ferroelectric properties confined by the coupling surface 15.

Figure 2:
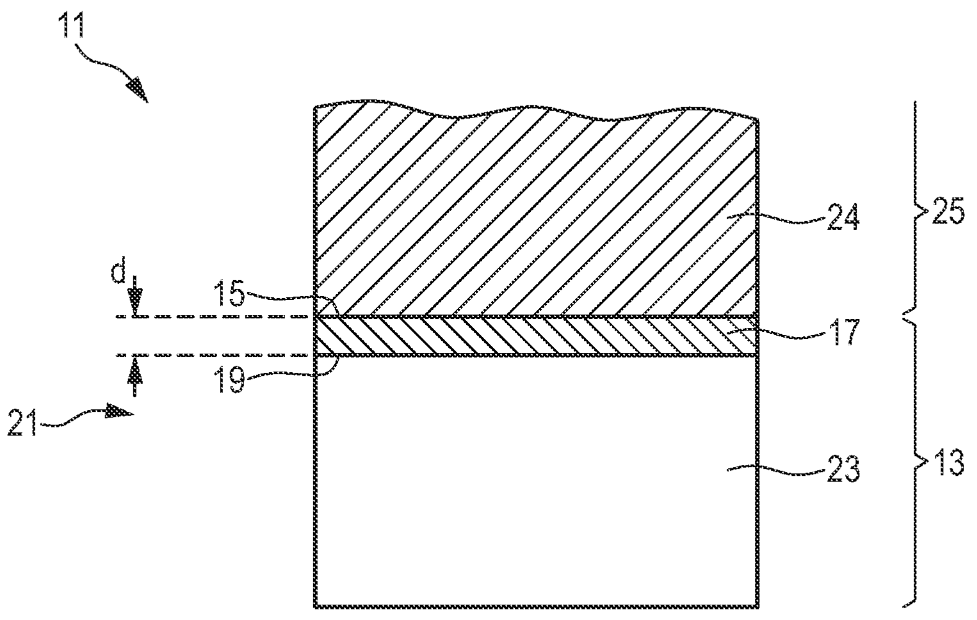
FIG. 2 shows a basic structure of the biochip of FIG. 1.

The basic structure of the biochip 13 is shown in detail in FIG. 2. It can be seen that a layer surface 19 opposite to the coupling surface 15 of the layer 17 is adjacent to a support structure 23 of the coupling arrangement 21 of the biochip 13. The coupling surface 15 and the layer surface 19 form opposing layer surfaces of the layer 17 having ferroelectric properties. Regarding the exact configuration of the support structure 23, there is a wide range of design freedom. For example, the support structure 23 may comprise a layer as shown in FIG. 2. This layer may, for example, comprise conductive regions which are made of a semiconductor material which, in order to achieve a desired electrical conductivity, is p-doped or n-doped. However, the support structure 23 may also comprise metallic conductor tracks which are arranged in or on the support structure 23. Further, the support structure 23 may be made of a flexible and biocompatible material such as polyimide.

The coupling surface 15 of the layer 17 delimits the biochip to an area 25 where the biological material is arranged. The biological material may be in an electrolyte 24. The biochip 13 and the region 25 comprising the biological material are components of the biochip arrangement or assembly 11. The biological material may include at least one neuron that may form a biological neuron.

In the shown example, the coupling surface 15 provides an electrode with a substantially smooth surface. In an example not shown, the coupling surface 15 is machined to have an increased surface area. This can increase an actively effective surface area to further increase charge transfer. The coupling surface 15 can overall be circular with a diameter of 5 μm to 200 μm, in particular 5 μm to 100 μm, in particular 30 μm. The coupling surface 15 may also have another shape, for example a rectangular or square shape or the shape of any other polygon (preferably with the same area as the circular coupling area). If several coupling areas 15 are provided per biochip 13, they may have a smallest distance of 5 μm to 500 μm from each other.

Figure 3:
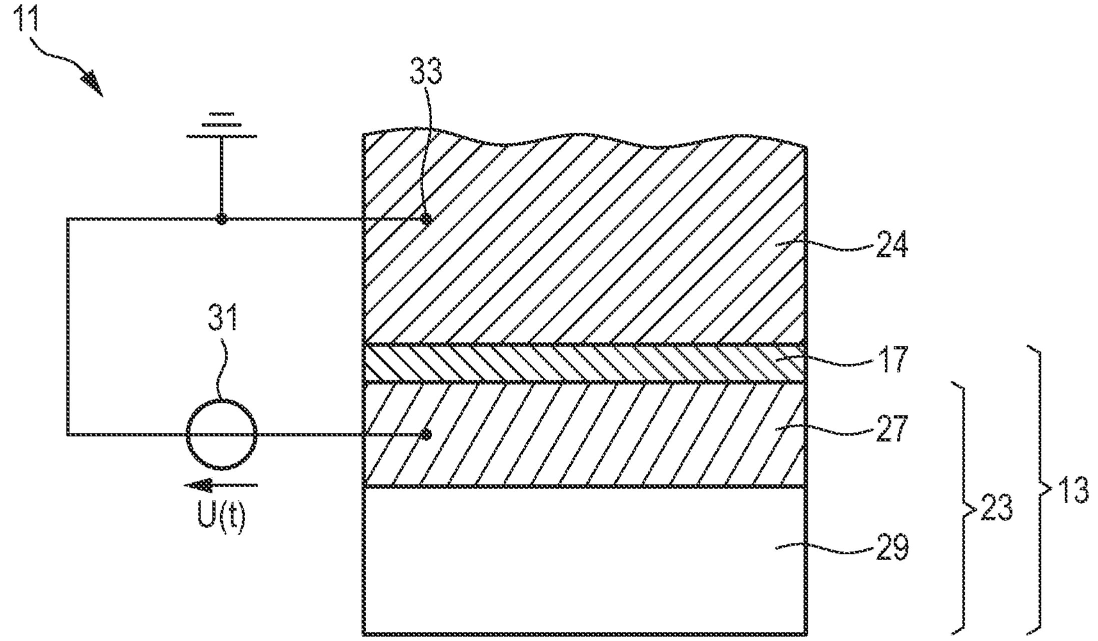
FIG. 3 shows a stimulation device of the biochip of FIG. 1.

FIG. 3 shows a cross-section of a biochip adapted for electrical stimulation of the biological material. Here, the support structure 23 has two layers, namely an electrically conductive electrode layer 27 directly adjacent to the layer surface 19, which may be formed of metal or doped semiconductor material, and a substrate layer 29 adjacent to the electrode layer 27. The electrode layer 27 is thus located between the layer 17 and the substrate layer 29. The electrode layer 27 is arranged at the layer 17 so that it interacts with the material of the layer 17 having ferroelectric properties, in particular when a temporally changing electrical voltage U(t) is applied to the electrode layer 27. For applying the voltage, suitable contacting may be provided as shown schematically in FIG. 3, through which a voltage source 31 may be connected to the electrode layer 27. Furthermore, the biochip arrangement 11 may comprise a counter electrode 33 with which the biological material and/or the electrolyte 24 can be contacted.

If the biological material (e.g. a nerve cell) in the electrolyte 24 is to be stimulated, an electrical voltage is applied to the electrode layer 27 and the counter electrode. U(t) is applied to the electrode layer 27 acting as an electrode and the counter electrode. Unlike devices with only electrically conductive electrodes, the electrolyte 24 is electrically insulated from the electrode layer 27 so that no direct current can flow that would lead to electrochemical charge transport.

Figure 4:
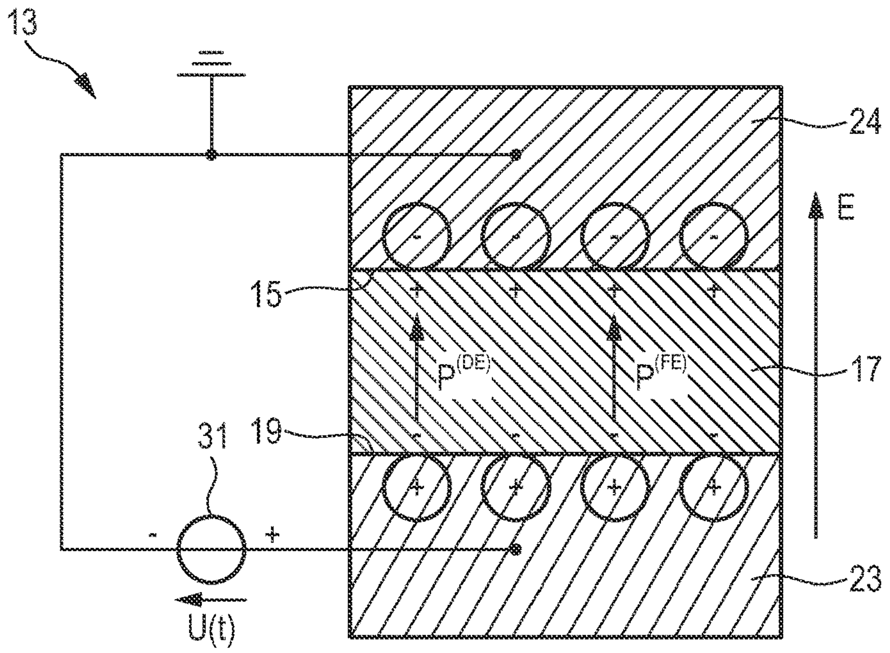
FIG. 4 shows a graphical illustration of the operation of the stimulation device of FIG. 3.

As shown in FIG. 4, as a result of the change over time in the voltage U(t) generated by the voltage source 31, there is nevertheless a charge shift or current flow in the electrolyte 24, which is used to electrically stimulate the biological material therein. As with purely capacitive stimulation, the current flow in the electrolyte corresponds to a Maxwellian displacement current.

The displacement current density is given as the time derivative $$J_D = \frac{\partial D}{\partial t}.$$

For a material with ferroelectric properties is $D(E)=\varepsilon_0\varepsilon_r E+P^{(FE)}(E)$ where $\varepsilon_0$ denotes the permittivity of the vacuum.

In the case of a ferroelectric layer, the displacement current density $$J_D = \varepsilon_0\varepsilon_r \frac{\partial}{\partial t}E + \frac{\partial}{\partial t}P^{(FE)}(E)$$

in electrolyte 24 is therefore composed of two components. One component is caused by a temporal change in the dielectric polarization $P^{(DE)}$ which, in turn, is influenced by the electric field E(t) within the layer 17 corresponding to the voltage U(t) electric field. This purely dielectric displacement current density is proportional to the dielectric constant $\epsilon_r$ of layer 17 and forms the only contribution in purely capacitive stimulation of biological material. In the case of a layer with ferroelectric properties, however, a further contribution occurs, which is caused by the temporal change in the ferroelectric polarization $P^{(FE)}$ which in turn is also influenced by the electric field E(t) within the layer 17 corresponding to the voltage. U(t). For a layer 17 of thickness d (see FIG. 2), which is confined by the two layer surfaces 15, 19, the following relationship applies $$E(t) = \frac{U(t)}{d}.$$

Figure 5:
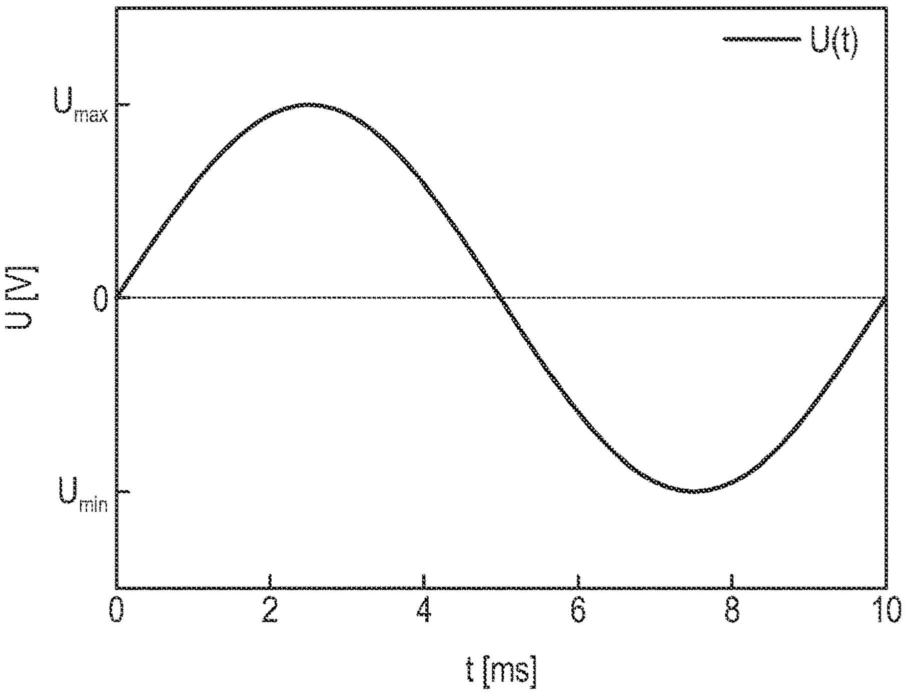
FIG. 5 shows a graphical illustration of the temporal characteristic of a possible voltage signal U(t) for the stimulation device from FIG. 3.

FIG. 5 exemplarily shows the temporal characteristic of a bipolar voltage signal in the form of a sine wave with a frequency f of 100 Hz and an amplitude $U_{max}=-U_{min}$, wherein a value of the voltage signal during its temporal course has a maximum value $U_{max}$ and a minimum value $U_{min}$, which correspond to a maximum value $E_{max}$ and a minimum value $E_{min}$ of the corresponding electric field strength E within the layer 17. Such voltage signals can for example be used for electrical stimulation of electrogenic cells, but they can also be used to measure the nonlinear and hysteretic relation D(E) of materials with ferroelectric properties.

Figure 6:
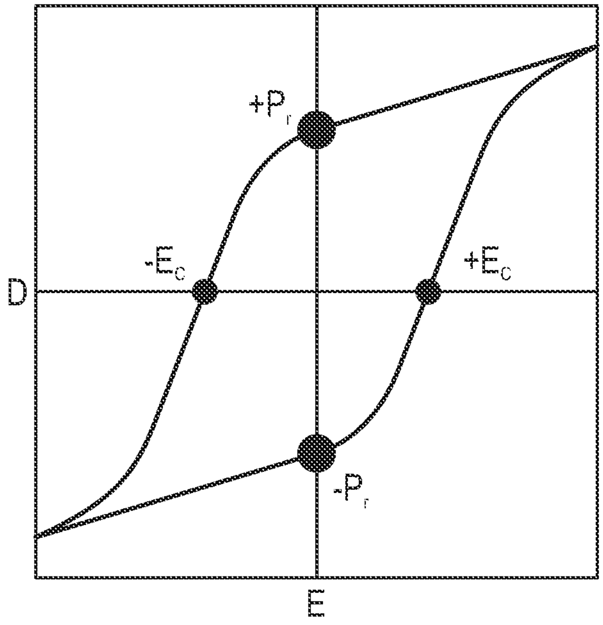
FIG. 6 shows a graphical illustration of the nonlinear and hysteretic relationship D(E) between electric field and electric displacement density of a ferroelectric layer of the biochip.

FIG. 6 shows the typical characteristic of the nonlinear and hysteretic relation D(E) for a ferroelectric material. By applying a field strength E which is higher than the material-specific coercivity field strength $E_C$ the ferroelectric polarization can be reversed. After switching off the electric field, the remanent polarization $P_r=P^{(FE)}(0)$ remains, which, depending on the history, can assume the two states $+P_r$ and $-P_r$. Ferroelectric memories are based on these two stable states.

Figure 7:
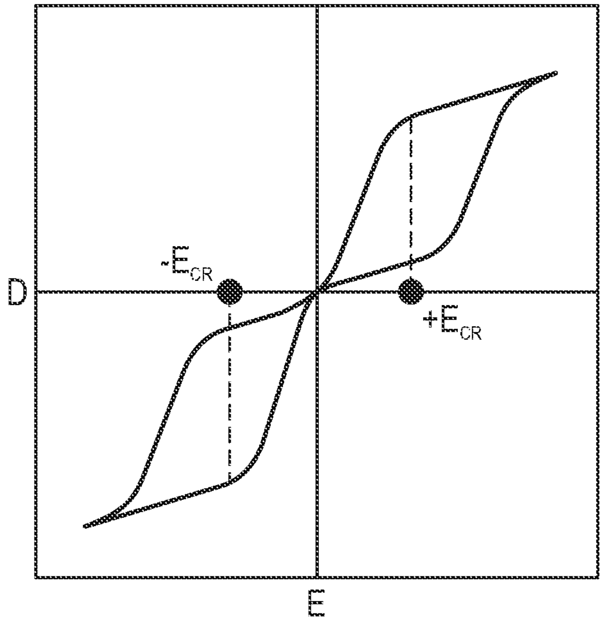
FIG. 7 shows a similar illustration as in FIG. 6, but for the case of an antiferroelectric layer.

FIG. 7 shows the typical characteristic of the nonlinear and hysteretic relation D(E) for an antiferroelectric material. Here, the ferroelectric hysteresis occurs only above a critical field strength of $E_{CR}$. After switching off the electric field, the electric polarization disappears again.

From the understanding of the nonlinear and hysteretic relationship D(E) shown in FIG. 6 and FIG. 7 of a material with ferroelectric properties, the stimulation efficiency can be quantified. If the stimulation efficiency is quantified with a transferred charge density $\rho_{stim}$ related to a unit area of approximately the coupling area 15 (caused by a voltage signal U(t) such as the one shown in FIG. 5 and measured, for example, in μC/cm2), the following general relationship results $\rho_{stim}=D(E_{max})-D(E_{min})$.

When the polarity of a ferroelectric material is reversed, which, for example, has the hysteresis curve D(E) shown in FIG. 6 it follows from the general relationship for the stimulation efficiency that $$\rho_{stim}=C_s(U_{max}-U_{min})+2P_r$$

Wherein $C_s$ is the capacitance per unit area (measured e.g. in μF/cm2) of a plate capacitor formed by the two layer surfaces 15, 19 and $P_r$ corresponds to the amount of the remanent polarization of the ferroelectric material of the layer 17.

The contribution resulting from the ferroelectric properties $2P_r$ of the transferred charge density $\rho_{stim}$ results from the fact that the voltage U(t) produced by the voltage source 31 causes a polarity reversal of the remanent polarization $P_r$ in the layer 17. For driving the biochip 13, the amplitude of the voltage signal U(t) can be selected in such a way that the corresponding field strength E in layer 17 is in terms of its magnitude at least as large as the coercive field strength $E_C$.

The layer 17 may consist of or at least comprise hafnium oxide (HfO2) with ferroelectric properties or doped hafnium oxide with ferroelectric properties.

For example, the layer 17 can consist of or at least comprise hafnium oxide doped with zirconium (Hf1-xZrxO2). For x=0.5 follows Hf0.5Zr0.5O2, which allows to produce the layer 17 with a thickness of d=9.5 nm. Such a layer 17 has the following properties at $U_{min}$=0V and $U_{max}$=1V:

$$\epsilon_r = 40,\ C_S = 3,7\ \mu\text{F/cm}^2,\ E_C = 100 \text{ or } 1000\ \text{kV/cm},\ P_r = 16\ \mu\text{C/cm}^2,$$
$$\rho_{stim} = 35,7\ \mu\text{C/cm}^2$$

It can be seen that the contribution $2P_r$ in this example is already 32 $\mu$C/cm$^2$ thus far exceeds the contribution achieved by purely capacitive stimulation.

The material which the layer 17 may also consist of or comprise aluminum scandium nitride (Al1-xScxN) with ferroelectric properties. This material is compatible with semiconductor fabrication processes that are also used for fabrication of CMOS circuits. Because of its relatively high remanent polarization of over 100 $\mu$C/cm$^2$ transmittable charge densities of more than 200 $\mu$C/cm$^2$ result.

Furthermore, the material that the layer 17 consists of or that the layer 17 comprises can also be an antiferroelectric. For example, the material may be silicon (Si) doped hafnium oxide (HfO2). Antiferroelectrics have a characteristic D(E) shown qualitatively in FIG. 7.

Finally, the material that the layer 17 comprises or that the layer consists of may also have multiferroic properties, i.e., be both ferroelectric and ferromagnetic. For example, this may be bismuth ferrite (BiFeO3).

Since the stimulation efficiency is largely determined by the ferroelectric properties, the thickness d of the layer 17 can be chosen comparatively large. Instead of the above-mentioned value of d=9.5 nm mentioned above, significantly larger values are also possible, e.g. more than 200 nm, 200 nm to 1500 nm, 200 nm to 800 nm or 500 nm to 1500 nm.

However, another effect can also be used. If the layer with ferroelectric properties is particularly thin, the memristive properties can occur in particular by forming a so-called ferroelectric tunnel contact. The biochip may thus be adapted for a ferroelectric tunnel contact to be formed. A thickness of the layer with ferroelectric properties is, for example, less than or equal to 100 nm, in particular less than or equal to 50 nm, in particular less than or equal to 20 nm, in particular less than or equal to 10 nm, in particular less than or equal to 7.5 nm, in particular less than or equal to 5 nm. in particular less than or equal to 4 nm in particular less than or equal to 2.5 nm.

It shall be understood that the ferroelectric layer 17 may be arranged not only exclusively in a planar (2D) plate capacitor design, but also in other arrangements such as a 3D capacitor structure such as a so-called deep-trench capacitor.

Figure 8:
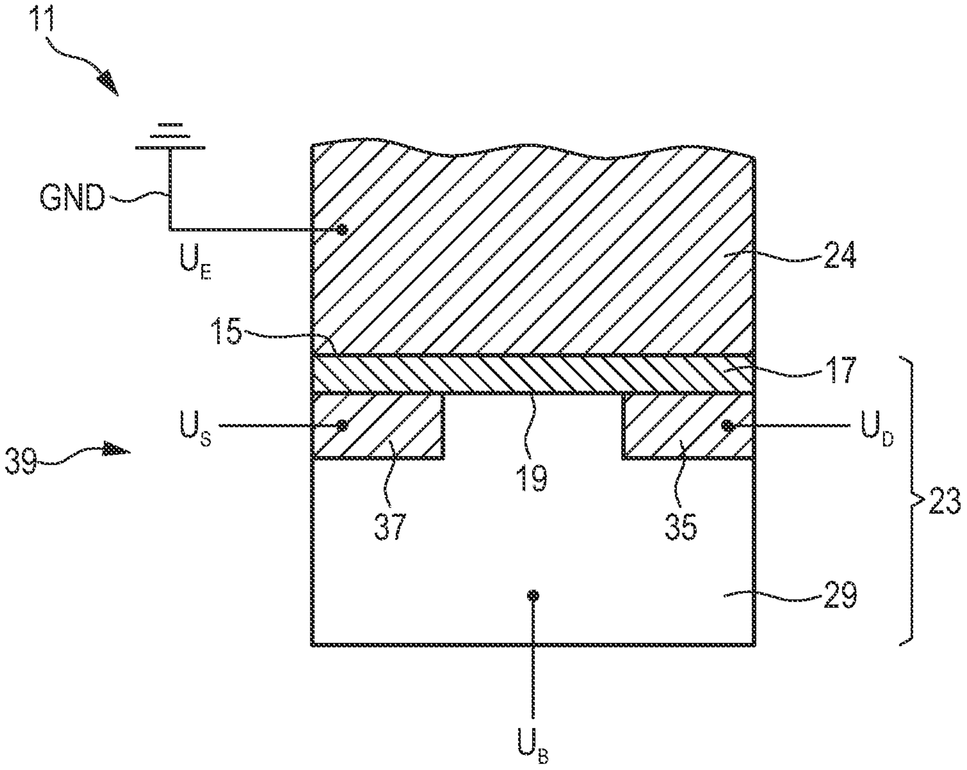
FIG. 8 shows a measuring device of the biochip of FIG. 1.

FIG. 8 shows a section of a biochip 13 that is adapted to perform electrical measurements on the biological material arranged in the electrolyte 24. The support structure 23 comprises a substrate layer 29 of semiconductor material. In the substrate layer 29, preferably in a region adjacent to the layer 17, a drain zone 35 and a source zone 37 are respectively arranged. The two zones 35, 37 are arranged spaced apart from each other at the layer 17. The two zones 35 and 37 may be formed in that the semiconductor material there is oppositely doped with respect to a doping of the substrate layer outside the zones 35, 37. For example, the two zones 35, 37 may be n-doped and the rest of the substrate layer 29 may be p-doped (or vice versa).

The substrate layer 29, the drain region 35 and the layer 17 form a ferroelectric field effect transistor (FeFET). The coupling surface 15 of the layer 17 corresponds to a gate contact of the FeFET 39, which is electrically connected to the electrolyte 24. The layer 17 forms an insulating layer of the FeFET 39, which is comparable to a gate oxide of a classical MOSFET. The drain region 35, the source region 37, and the substrate layer 29 are electrically connected to respective terminals UD, US, and UB of the FeFET 39, which form a drain contact, a source contact, and a bulk contact of the FeFET 39, respectively. The electrolyte 24 may be brought to a reference potential, for example a ground potential GND, with a reference electrode. Here, it may be provided that the bulk terminal UB of the FeFET is at the same electrical potential as the electrolyte 24 and/or that the reference electrode is integrated into the substrate layer 29.

The FeFET 39 may form a part of an input stage of the biochip arrangement 11, which is adapted for electrical measurements on biological material, in particular on neurons arranged therein. Furthermore, the FeFET 39 may further form a part of an artificial neuron. Overall, the biochip arrangement 11 can be used to perform studies on neural tissue. The biochip arrangement 11 may be used for neuromorphic computing. Furthermore, the biochip arrangement 11 may be a brain-machine interface, in particular a brain-computer interface.

Figure 9:
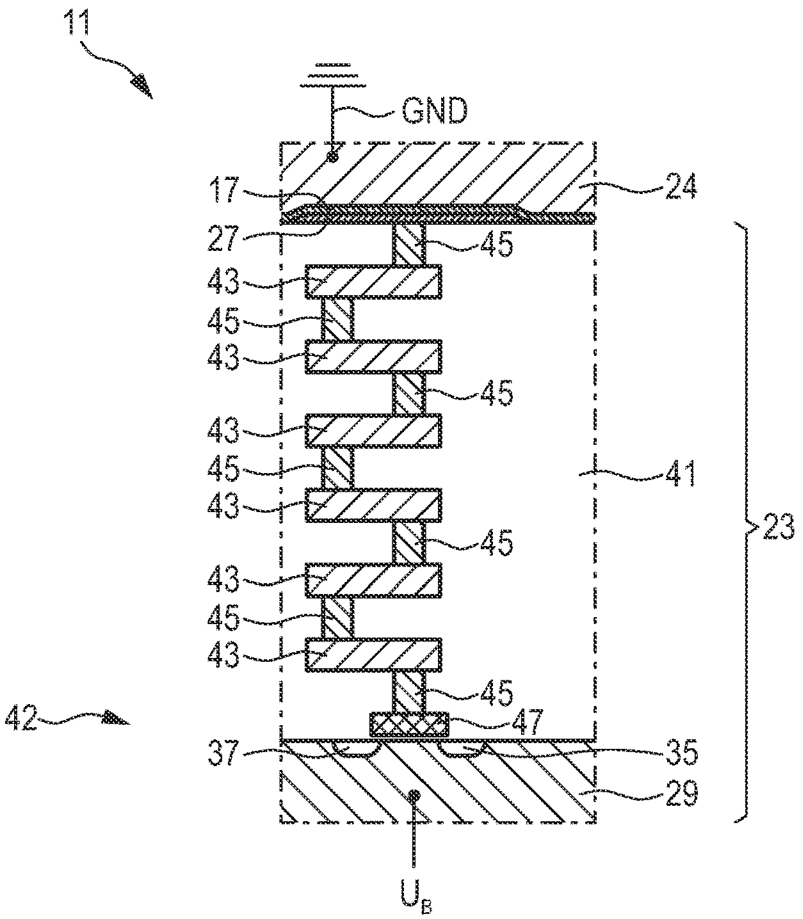
FIG. 9 shows a further measuring device of the biochip from FIG. 1.

A measuring device of the biochip 11 can also be implemented as shown in FIG. 9. Other than the measuring device shown in FIG. 7, the support structure 23 has an electrical connection arrangement ("metal stack" 41). An insulating layer 47 is associated with the drain zone 35 and the source zone 37, resulting in a MOSFET structure 42 comprising the two zones 35, 37 and the insulating layer 47. The insulating layer 47 may be disposed on the substrate layer 29 and/or may be made of polysilicon. The connection arrangement 41 is disposed between the insulating layer 47 and the ferroelectric layer 17 so as to electrically connect them together. In the shown example, six metal layers ("metal layers") are provided in the semiconductor technology used. Accordingly, the connection arrangement 41 comprises six conductors 43 arranged in different metal layers, with conductors of adjacent metal layers being connected via vias 45. Deviating from this, the number of metal layers can be varied as required.

Figure 10:
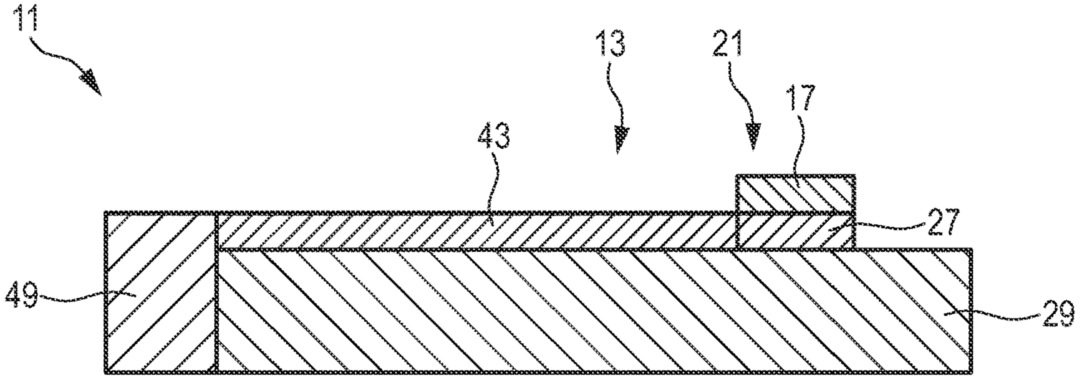
FIG. 10 shows a biochip arrangement with a measuring device.

Another example of a measuring device is the arrangement 11 shown in FIG. 10, which is particularly suitable for carrying out in vivo measurements. Similar to the measuring device in FIG. 9, the measuring device comprises a MOSFET. However, this belongs to a semiconductor chip 49 which is separate from the biochip 13. A connection of the semiconductor chip 49 is electrically connected to the electrode layer 27 via a conductor track 43. The terminal may be a gate terminal of the MOSFET. In the shown example, the conductor track 43 is provided on the substrate 29 of the biochip 13. The substrate 29 may be formed of a biocompatible dielectric material, such as a polyimide. Here, the conductor track 43 and the substrate 29 may form a flexible printed circuit board ("flex PCB"). The conductor track 43 may, for example, be made of gold and/or be electrically insulated on a side facing away from the substrate 29, for example by means of a parylene layer.

In the measuring arrangement, the elements 43, 27 and 17 may be provided a plurality of times and arranged side by side, for example in a direction at least substantially orthogonal to the drawing plane of FIG. 10. In this way, a multi-channel measuring arrangement with multiple coupling arrangements 21 is obtained.

The arrangement 11 in FIG. 10 can also be adapted for stimulation of the biological material. For this purpose, at least part of the coupling surfaces and/or a circuit in the semiconductor chip 49 can be adapted accordingly. If different coupling surfaces at the respective layers 17 are used for the measurements and for the stimulation, the measurements and the stimulation can be carried out at different locations on a surface of the arrangement 11 and at different locations of the biological material, respectively. Thus, simultaneous and spatially resolved measurement and stimulation is enabled. Optionally, the biochip is arranged for simultaneous measurement and stimulation. For example, the biochip may comprise multiple different coupling surfaces. The biochip can comprise at least one coupling surface for measurement and at least one further coupling surface for simultaneous stimulation.

In conclusion, a biochip 13 is described herein that exhibits the nonlinear and hysteretic pattern D(E) shown in FIGS. 6 and 7 of the electrical displacement density D in the layer with ferroelectric properties 17 as a function of the electric field in order to achieve a higher charge transfer E into the electrolyte 24 than would be possible with a purely capacitive stimulation. Hereby, electrical stimulation of biological material can be achieved with a higher stimulation efficiency. This in turn allows for the first time the construction of microelectrode arrays and electrically active implants with a high electrode density without electrochemical charge transport between the coupling surface 15 and the electrolyte 24. Furthermore, measurements on the biological material can be carried out using the FeFET 39, using a measuring device with the MOSFET 42, or using a passive measuring device.

What is claimed is:

1. A biochip comprising at least one coupling arrangement configured for electrical stimulation of biological material or electrical measurement of the biological material, the biochip comprising:

a support structure arranged at and/or in the coupling arrangement; and a layer, a layer surface of which is arranged at the coupling arrangement, and an opposite layer surface of which forms a coupling surface for electrical stimulation of the biological material and/or for electrical measurement on the biological material;

wherein the layer has ferroelectric properties;

wherein the biochip is configured for simultaneous measurement as well as stimulation and to this end comprises a plurality of mutually separated coupling surfaces with different associated coupling arrangements;

wherein the biochip comprises at least a first coupling surface with an associated first coupling arrangement which is configured for an electrical measurement on the biological material and comprises a field-effect transistor and/or electrical conductors for a connection to a field-effect transistor and at least one further, second coupling area with an associated second coupling arrangement, which comprises an electrically conductive electrode layer adjacent to the layer and is configured for electrical stimulation of the biological material.

2. The biochip according to claim 1, wherein the layer comprises hafnium oxide with ferroelectric properties.

3. The biochip according to claim 2, wherein the hafnium oxide with ferroelectric properties is doped with silicon or zirconium.

4. The biochip according to claim 3, wherein the zirconium-doped hafnium oxide with ferroelectric properties has the composition $Hf_{0.5}Zr_{0.5}O_2$.

5. The biochip according to claim 1, wherein the layer comprises zirconium oxide or aluminum scandium nitride having ferroelectric properties.

6. The biochip according to claim 1, wherein a thickness of the layer is greater than 200 nm.

7. The biochip according to claim 1, wherein the support structure comprises a substrate of a semiconductor material.

8. The biochip according to claim 1, wherein one or more of: the biochip has memristive properties and the layer is adapted such that a ferroelectric tunnel contact is formed.

9. An implant comprising a biochip comprising at least one coupling arrangement for electrical stimulation of biological material or for electrical measurement on the biological material, wherein the biochip is a biochip according to claim 1.

10. The implant according to claim 9, wherein the implant is a retinal implant, a cochlear implant, an implant for deep brain stimulation and/or an implant for providing a brain-machine interface.

11. The implant according to claim 9, wherein the implant comprises a semiconductor chip separate from the biochip, wherein a terminal of the semiconductor chip is electrically connected via a conductor track to an electrode layer adjacent to the layer surface and the conductor track and the biochip are arranged on a common substrate.

12. An in vitro assembly comprising at least one biochip and an electrolyte receptacle for receiving an electrolyte comprising biological material, wherein the electrolyte receptacle is adapted to dispose the electrolyte on at least one coupling surface of the biochip for electrical stimulation of the biological material and/or electrical measurement of the biological material, wherein the at least one biochip is a biochip according to claim 1.

13. The in vitro assembly according to claim 12, wherein the assembly comprises at least one biological neuron and at least one artificial neuron.

14. The biochip according to claim 1, wherein the first coupling arrangement comprises the field-effect transistor and the layer forms a part of the field-effect transistor.

15. The biochip according to claim 1, wherein the first coupling arrangement also comprises an electrically conductive electrode layer adjacent to the layer, which is electrically connected to the field-effect transistor or to an electrical conductor for connection to the field-effect transistor.

16. The biochip according to claim 1, wherein the biochip provides a connection for connecting a voltage source to the electrode layer of the second coupling arrangement.

17. The in vitro assembly according to claim 12, wherein the in vitro assembly comprises a voltage source connected to the electrode layer of the second coupling assembly.

18. In vitro assembly according to claim 12, wherein the implant comprises a semiconductor chip separate from the biochip, wherein said semiconductor chip comprises the field-effect transistor, and wherein a terminal of the semiconductor chip is electrically connected via a conductor track to an electrode layer adjacent to the layer surface, and the conductor track and the biochip are arranged on a common substrate.

19. The in vitro assembly according to claim 12, wherein the in vitro assembly further comprises a counter electrode with which the biological material and/or the electrolyte can be contacted.

* * * * *